(12) United States Patent
Kudo et al.

(10) Patent No.: US 7,341,640 B2
(45) Date of Patent: Mar. 11, 2008

(54) METHOD OF AND APPARATUS FOR FORMING RUBBER STRIP MATERIALS FOR BUILDING TIRES AND METHOD OF BUILDING TIRES

(75) Inventors: Shigeo Kudo, Osaka (JP); Tetsuo Tatara, Osaka (JP); Masami Tanabe, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 360 days.

(21) Appl. No.: 10/789,072

(22) Filed: Feb. 27, 2004

(65) Prior Publication Data

US 2005/0189061 A1 Sep. 1, 2005

(51) Int. Cl.
*B29D 30/60* (2006.01)
*B29C 47/92* (2006.01)

(52) U.S. Cl. ............. 156/117; 156/130; 264/40.6; 264/211.23

(58) Field of Classification Search ............ 156/117, 156/130; 425/379.1, 143, 144; 264/40.1, 264/40.6, 211.23, 327
See application file for complete search history.

(56) References Cited

U.S. PATENT DOCUMENTS

| | | | | |
|---|---|---|---|---|
| 2,688,770 A | * | 9/1954 | Henning | 264/349 |
| 2,746,089 A | * | 5/1956 | Hendry | 264/328.4 |
| 5,156,781 A | * | 10/1992 | Böhm et al. | 264/40.1 |
| 2002/0089077 A1 | * | 7/2002 | Ogawa et al. | 264/40.6 |

FOREIGN PATENT DOCUMENTS

JP 2002-205512 A * 7/2002

* cited by examiner

*Primary Examiner*—Geoffrey L. Knable
(74) *Attorney, Agent, or Firm*—Jordan and Hamburg LLP (57) ABSTRACT

Method for forming a rubber strip which enables a wider rubber of small thickness without lowering an extruding speed and enables to reduce a building cycle time, thereby increasing the efficiency of tire manufacturing. Temperatures at a main-part casing 11, a screw shaft 12 and a head region included with the die 13 are controlled to be different from each other in a manner that: the temperature as controlled in the main-part casing 11 is higher than that in the screw shaft 12; and the temperature as controlled in the head region is higher than that in the main-part casing 11, when continuously extruding a rubber material in a form of a ribbon in forming a rubber strip 1.

7 Claims, 8 Drawing Sheets

METHOD OF AND APPARATUS FOR FORMING RUBBER STRIP MATERIALS FOR BUILDING TIRES AND METHOD OF BUILDING TIRES

FIELD OF THE INVENTION

The invention relates to a method and apparatus for forming a rubber strip to be used for manufacturing a tire comprised or a plurality of rubber parts, and to a method of manufacturing a tire by use of thus formed rubber strip.

BACKGROUND OF THE INVENTION

Figure 15:
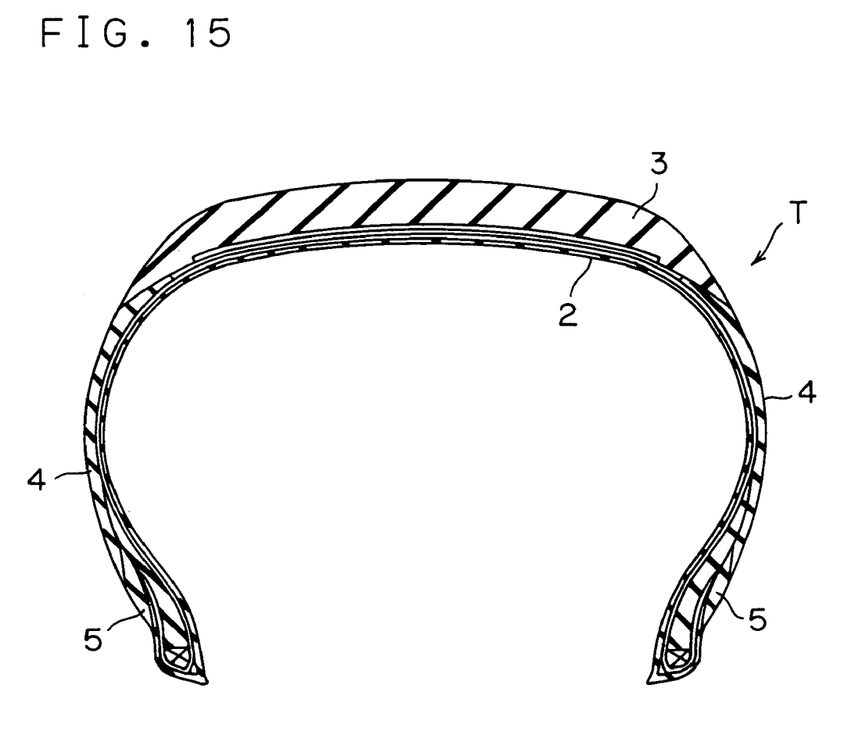
FIG. 15: A sectional view explanatory of a tire structure.

In general, the tire is formed of a plurality of rubber parts. Typically, as shown in FIG. 15, an inner liner rubber part 2, a tread rubber part 3, a side wall rubber part 4 and a rim strip rubber part 5, and the other part if any are formed of respective rubber materials or parts corresponding to respectively required property, when to form such rubber part, a die in conformity with the sectional shape of each of the rubber parts is used in an extruder for continuously extruding each of the rubber parts. Subsequently, the desired rubber part is obtained by cutting the extruded article in a given length. The tire is built by sequentially bonding the aforesaid rubber parts to one another on a rotary support body such as a tire-building drum.

More recently, however, precision requirements for tire configuration or profile have become stricter. In addition, there is a problem associated with strain or shrinkage of the rubber parts, which results from the process of continuously extruding the article from the extruder and cutting the article in the given length. Hence, as disclosed in the Patent Documents 1 and 2 listed later, it has become the practice to form the rubber part having a predetermined sectional shape by spirally winding an un-vulcanized rubber strip on the rotary support body such as a building drum along the circumferential direction of tire and in an overlapped relation, the rubber strip extruded in the form of a ribbon.

The present applicant has also proposed to regulate a positional shift or misalignment between a winding start position and a winding end position of the rubber strip to the range of zero to 5 mm with respect to the circumferential direction of the tire, when the aforesaid ribbon-shaped rubber strip is used to build the rubber part is used. By this way, improvement is made to the weight balance and the like of the tire. When the positional shift or misalignment become large, weight balance and uniformity of the tire deteriorated as to adversely affect running performance of the tire (later-listed Patent Document 3).

Meanwhile, if the amount of side-by-side overlapping of the aforesaid rubber strip is too great, there is a fear that the weight balance or uniformity of the tire may be adversely affected because the resultant rubber part suffers such a heavy unevenness or ruggedness of the sectional shape thereof as to fail to present the desired sectional shape. For this reason, the present applicant has also proposed to build the rubber part by winding the rubber strip in a manner to ensure that the amount of overlap with respect to the tire width is limited to the range of ½ to ⅕ of the width of the aforesaid rubber strip (later-listed Patent Document 4).

According to the above building method, the rubber-strip has a sectional shape substantially of a crescent, triangle or trapezoid which is decreased in thickness at edge portions on both sides, which are to be overlapped, in order to eliminate rugged or stepped portions after the rubber strip is wound and attached in manner side-by-side-wise partially overlapped.

Figure 16:
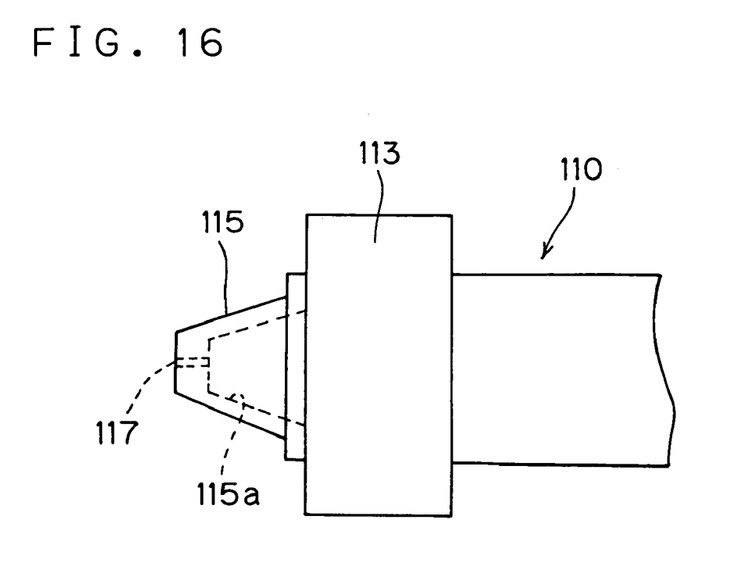
FIG. 16: A side view schematically showing a head of an extruder for extruding a rubber strip in conventional technique.

As shown in FIG. 16, the rubber strip is formed as extruded from an extruder 110 that has a discharge port 117 in a sectional shape of substantially flatten crescent or triangle for example; the discharge port 117 being at distal end of a cavity 115a of the die 115 that is provided on head 113 of the extruder 110.

Figure 17:
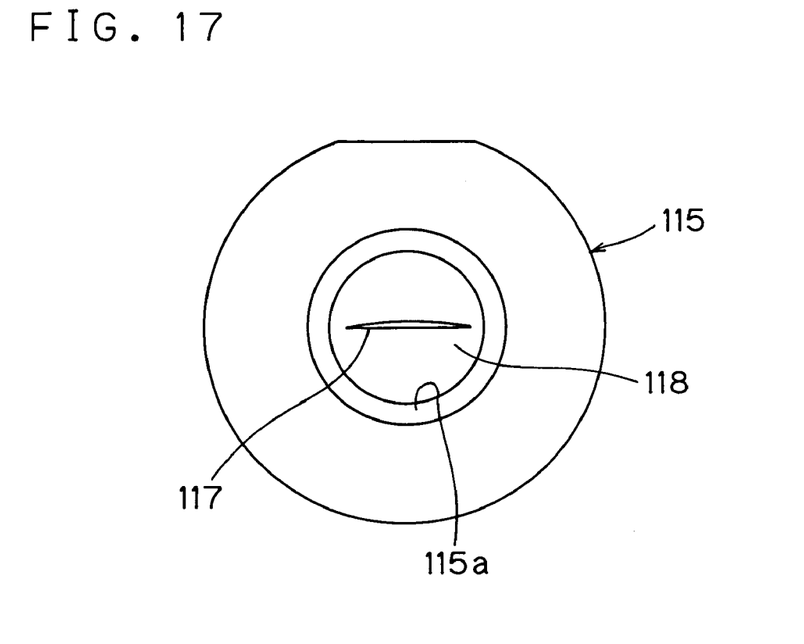
FIG. 17: An elevational view from rearward, of the die of the extruder in conventional technique.
Figure 18:
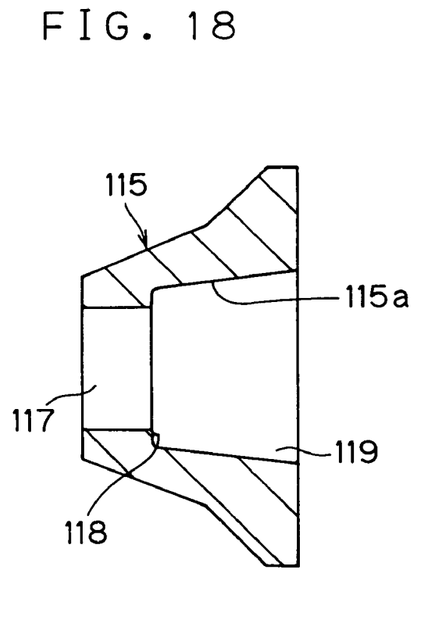
FIG. 18: A sectional plan view explanatory of a cavity of the above die.
Figure 19:
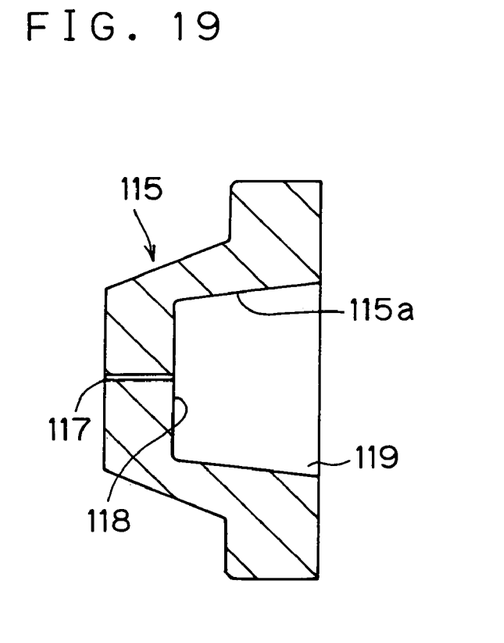
FIG. 19: A sectional side view explanatory of the cavity of the above dies.

AS shown in FIGS. 17-19, the die 115 being used for such molding has a shoulder 118 for narrowing down at the distal end of the cavity 115a while the discharge port 117 is located at middle of the shoulder 118. The cavity 115a is generally shaped as tapered as gradually narrowed toward the shoulder 118 from rear-end opening 119 of the die, which is connected with the head 110. The molten rubber being forwarded to the die 115 is given further enhanced pressure by narrow-down effect of the shoulder 118.

For partial overlapping of thus extruded rubber strip material at winding-wise attaching at forming of tire, it is more preferred that transversely opposite near-edge parts of the strips have smaller thickness. Nevertheless, this causes a great difference in flow velocity and pressure for the molten rubber in the die 115 between a center portion and transversely opposite near-edge parts. Therefore, with decrease in the thickness at the near-edge parts, the rubber strip is more likely to suffer defects such as cracks and cutouts at the transversely opposite near-edge parts.

The building methods disclosed in the Patent Documents 3 and 4, in particular, suggest that the rubber strip may preferably have the sectional shape substantially of a relatively flat crescent having the width of 5 to 30 mm, the thickness of 0.5 to 3.0 mm at around centerline, and the thickness of 0.05 to 0.2 mm at along the edges on transversely opposite sides. The only way to be taken by these methods to reduce the thickness at along the edges to 0.05 to 0.2 mm is to extrude the rubber strip from the dies of the extruder at a lower speed thereby to apply tension to the extruded rubber strip for elongation. As a result, the defects such as cracks and cutouts are more likely to occur at portions along edges having reduced thickness.

In the tire manufacturing, a cycle time for building each tire is a crucial factor. Unfortunately, the aforementioned configuration of the cavity of the conventional dies entails the problem that there is the great flow rate difference of the rubber material between the central part and the near-edge parts on opposite sides, in the cavity. Thus, if the rubber strip has an increased width, it is difficult to achieve a desired thickness at along edges of the rubber strip. If, on the other hand, the rubber strip has a narrow width, the thicknesses at along edges become large. Hence, the only way to satisfy the requirements that the rubber strip is increased in width but decreased in thickness at along the edges is to form the rubber scrip at a lowered extruding speed. Consequently, it is unavoidable to impair the building cycle time of the tire manufacturing.

Most of the aforementioned problems are derived from the variations in viscoelastic properties of rubber material being extruded from the extruder and the flow rate differences of the rubber material in the cavity of the dies. In view of use of such rubber material, a solution to the aforementioned problems is desired. Particularly, a measure for satisfying the requirement of reducing the thickness at along edges of the rubber strip (0.05 to 0.2 mm) not only offers a significant contribution to the reduction of vulcanizing time of tire but also provides an effective means for reducing defects such as bareness and air inclusion occurring at the surface of the vulcanized tire. Hence, the solution to the above problems is strongly desired.

Patent Document 1: JP-A-2000-202921
Patent Document 2: JP-A-9(1997)-029858
Parent Document 3: JP-A-2002-178415
Patent Document 4: JP-A-2002-205512

BRIEF SUMMARY OF THE INVENTION

In view of the foregoing, the invention has been accomplished. The invention provides a method and an apparatus for forming a rubber strip which permit a wider rubber strip of small thickness to be smoothly extruded from the dies of the extruder without lowering the extruding speed thereby preventing the prolonged building cycle time per tire. The invention further provides a method for manufacturing a tire in which the rubber strip thus formed is used for building a rubber part.

In one aspect of the invention directed to the solution to the above problems, a method of forming an un-vulcanized rubber strip as extruded from a die of an extruder, which is to be spirally wound to form a rubber part for tire manufacturing; temperatures at a main-part casing, a screw shaft and a head region included with the die being controlled to be different from each other in a manner that: the temperature as controlled in the main-part casing is higher than that in the screw shaft; and the temperature as controlled in the head region is higher than that in the main-part casing, when continuously extruding a rubber material in a form of a ribbon.

By extruding the rubber strip in this manner, the occurrence of the defects such as cracks and cutouts at along edges is dramatically decreased although the extruding speed is not so lowered as done by the prior art. Moreover, the rubber strip of small thickness and a great width is continuously extruded without lowering the extruding speed and without a fear of defects.

In the above method of the invention, the temperature as controlled in the die may be set as equal to or higher than that in the head, when the extruding. This enables even more preferred extrusion of the rubber strip.

According to the above forming method, the rubber strip extruded from the die may have a profile in which thickness is progressively reduced from at around centerline to edges on both sides; and width of the rubber strip is in a range of 5 to 50 mm while the thickness of the rubber strip is in a range of 0.5 to 3.0 mm at around the centerline, and in a range of 0.05 to 0.2 mm at along the edges, when extruded in the form of a ribbon. If the rubber strip has such a sectional shape, a rubber part having a desired sectional shape is smoothly built with high precisions by spirally winding the rubber strip in an overlapped relation. Furthermore, such a rubber strip also contributes to the reduction of the vulcanization time of tire and of the occurrence of the defects such as bareness an air inclusion at the tire surface.

In another aspect of the invention, an apparatus used by the aforementioned forming method of rubber strip has following features; temperatures at a main-part casing, a screw shaft and a head region included with the die are set as controlled as to be different from each other in a manner that; the temperature as controlled in the main-part casing is higher than that in the screw shaft; and the temperature as controlled in the head region is higher than that in the main-part casing. In this aspect, it is preferred that the temperature as controlled in the die is equal to or higher than that in the head. The aforesaid forming method of rubber strip may preferably be carried out by using such a forming apparatus.

In the above forming apparatus for rubber strip, said die may be comprised of: a shoulder for narrowing-down a passage or throttling: a discharge port continuous with a distal portion of a cavity of the die through the shoulder; and an intermediate narrowing-down portion that is formed as stepped between distal and rear parts of the cavity and as disposed at substantially middle in the cavity with respect to a passage in flow-out direction from a rear opening communicated which the head till the discharge port, so that a throttling or narrowing-down of a passage for a rubber material is made at the intermediate narrowing-down portion as well as at said shoulder.

The use of the die configured in the above manner enables to enact a two-stage narrowing-down-passage or throttling effect on the rubber material forwarded into the die, at the shoulder on distal side and the intermediate narrowing-down portion. Thus, flow-rate difference and pressure fluctuation at the shoulder for narrowing down become smaller than those in the conventional technique, as to extrude the rubber strip under substantially uniform pressure from the discharge port. This further enhances the effect to prevent the occurrence of the defects at along edges and makes the method of forming the rubber strip be carried out more favorably. Particularly, the aforesaid die makes a threshold speed for starting to cause defects at along edges to be much more increased as compared with dies of a conventional configuration. Hence, a wider rubber strip reduced in thickness at along edges as compared with the conventional rubber strip is extruded at a higher extruding speed, when the die is constructed as follows, flow-rate difference and pressure variation at said shoulder is further restrained while enhancing the effect of eliminating the defect at along the edges; the construction is: in a view from rearward, said distal part of the cavity appears to be a long hole arranged in conformity with longitudinal direction of the discharge port; and said distal part is continuous with said shoulder for narrowing down at distal side.

In still another aspect of the invention, a method for manufacturing a tire comprised of a plurality of rubber parts has following features: in respect of at least one of said rubber parts, there is used the rubber strip formed as extruded from the die of the extruder in a form of un-vulcanized rubber strip by the above method according to the invention; as to form the rubber part in a predetermined profile by feeding the rubber strip to a rotary support body for building the tire, to be wound and attached in a tire circumferential direction along a spiral in a manner partially overlapped. This enables the rubber part to be built by using the wide rubber strip of small thickness as described above so that the tire may be efficiently manufactured without lowering the building cycle time. In addition, the tire rubber part of a desired sectional shape may be built with high precisions. What is more, the vulcanizing time of tire may be reduced while the occurrence of the defects such as the air inclusion at the tire surface may be prevented. Thus, the tire of high quality can be manufactured.

According to the aforementioned tire manufacturing method, it is preferred that a positional misalignment in a tire circumferential direction is restrained in a range of 0 to 5 mm between start and end positions for winding and attaching of the rubber strip to form a rubber part of the tire. This reduces the weight variations of the rubber part and hence, there may be manufactured tires improved in the weight balance and uniformity.

In addition, it is preferred to wind the rubber strip in a manner to ensure that an amount of overlap of the rubber strip with respect to a widthwise direction of tire is in the range of ½ to ⅕ of the width of the rubber strip.

If the amount of overlap is more than ½ of the width of the rubber strip, the unevenness or ruggedness of the overlapped part becomes more apparent so that a desired sectional shape cannot be obtained. The formation of a smooth sectional shape is facilitated by limiting the amount of overlap to ½ or less of the width of the rubber strip. If on the other hand, the amount of overlap is less than ⅕ of the width of the rubber strip, the rubber strip is prone to come apart. It is therefore preferred to set the amount of overlap in the range of ½ to ⅕ of the width of the rubber strip. This provides for the manufacturing of the tire improved in the weight balance and uniformity.

It is further preferred that at least two of the plurality of rubber parts are formed by spirally winding and attaching respective ones of the rubber strips along a circumferential direction of the tire, at respective process steps for the winding and attaching; and rotation wise positions for staring of winding and attaching the respective rubber strips are disagreed with each other by 10 degrees or more in the circumferential direction of the tire.

Specifically, there is a fear of losing the weight balance if the winding start positions for plural rubber parts are in similar rotational position or "phase" with respect to the circumferential direction of the tire. Hence, the arrangement is made such that such phases of the winding start positions are shifted from each other by 10 degrees or more, as described above.

As described above, according to the forming method and apparatus for rubber strip of the invention, the temperature as controlled in the main-part casing is higher than that in the screw shaft; and the temperature as controlled in the head region is higher than that in the main-part casing. Hence, the wider rubber strip reduced in thickness at along edges is efficiently extruded from the die without lowering the extruding speed while the occurrence of the defects such as cutouts at along both edges of the rubber strip is dramatically reduced or prevented. Furthermore, the building cycle time per tire is reduced so that the tires are efficiently manufactured.

According to the tire manufacturing method of the invention using the aforesaid rubber strip, the tires may be efficiently manufactured without impairing the building cycle time. Furthermore, the tire rubber part of a desired sectional shape may be built with high precisions. What is more, the tires of high quality, which are improved in the weight balance and uniformity, may be efficiently manufactured.

DETAILED DESCRIPTION OF THE INVENTION

Modes for carrying out the invention will be described by use of embodiments illustrated by the accompanying drawings.

Figure 1:
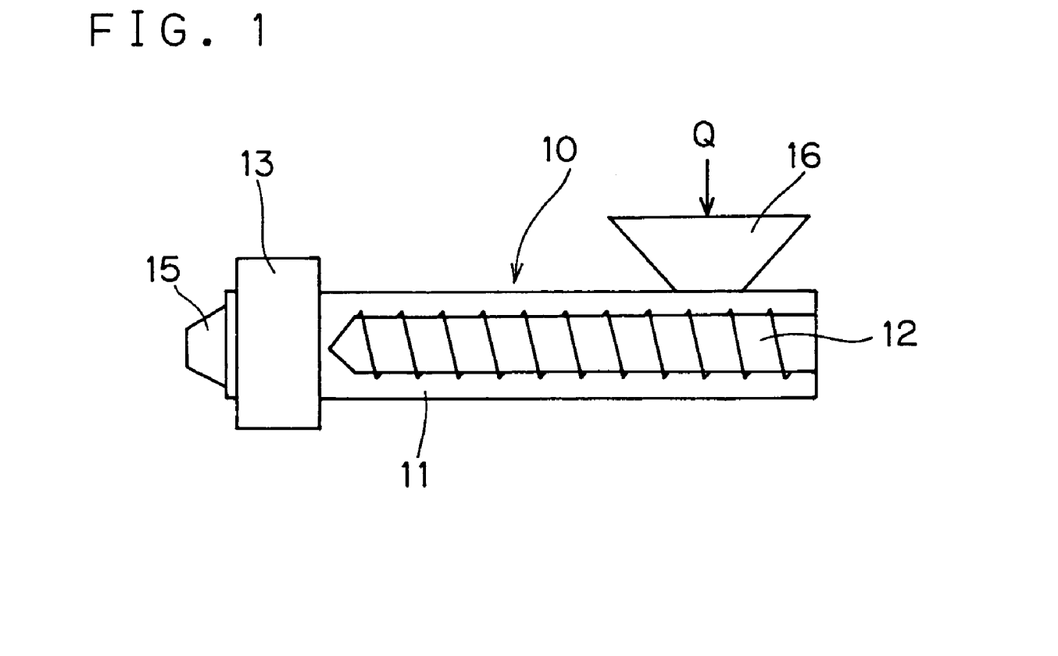
FIG. 1: A schematic side view showing an extruder comprising a forming apparatus used by a method of forming rubber strip according to the invention.
Figure 2:
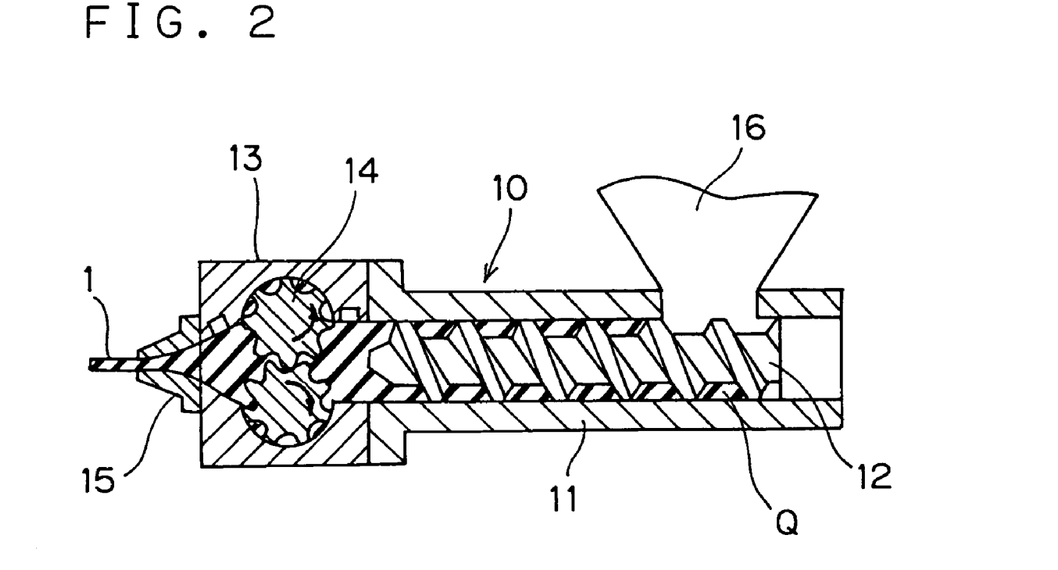
FIG. 2: A sectional view explanatory of the above extruder.
Figure 3:
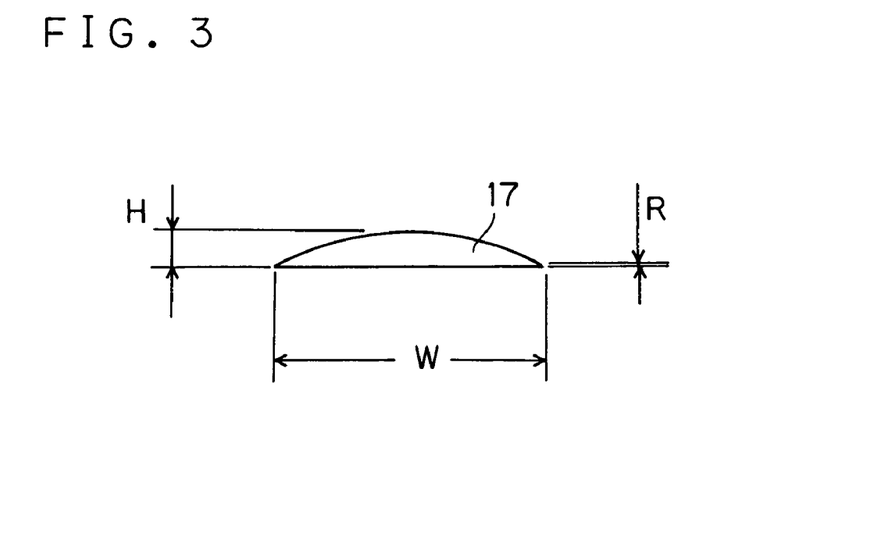
FIG. 3: A front view roughly illustrating an example of a discharge port of die.
Figure 4:
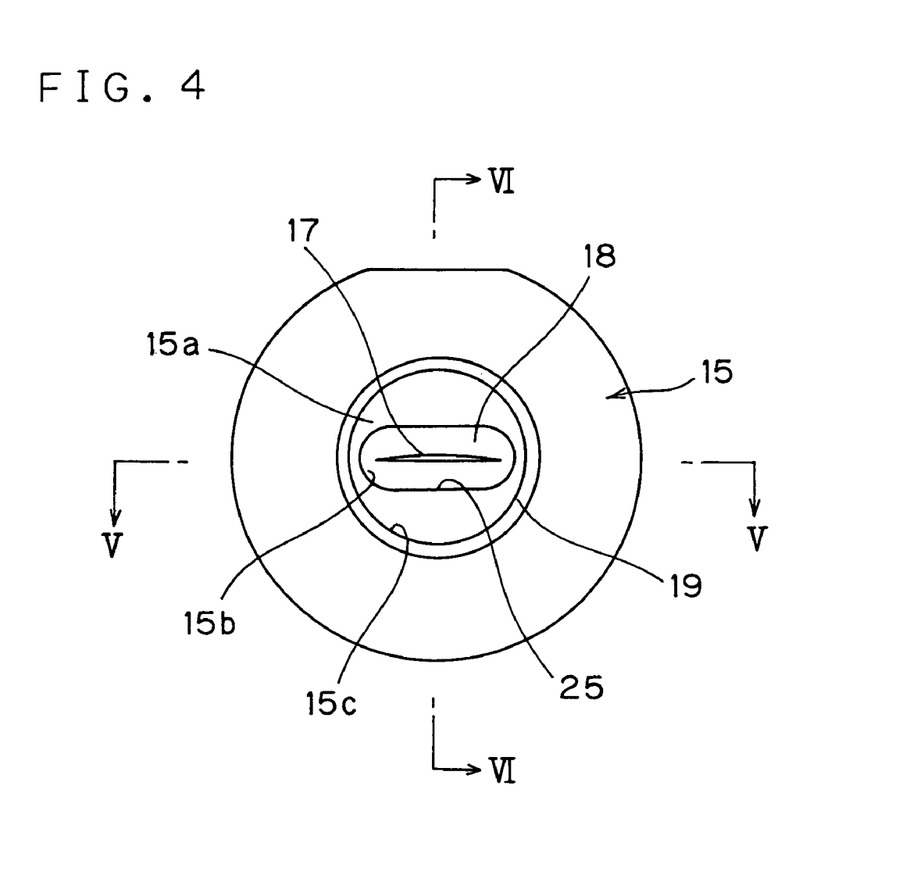
FIG. 4: An elevational view from rearward, of the die shown in FIG. 3.
Figure 5:
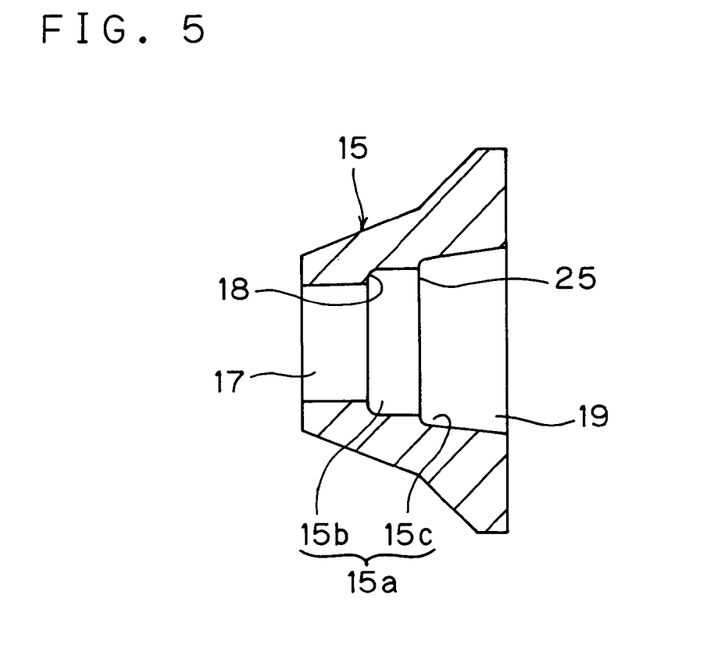
FIG. 5; A sectional view taken on the line V-V in FIG. 4 and explanatory 0of a configuration of a cavity of the above die.
Figure 6:
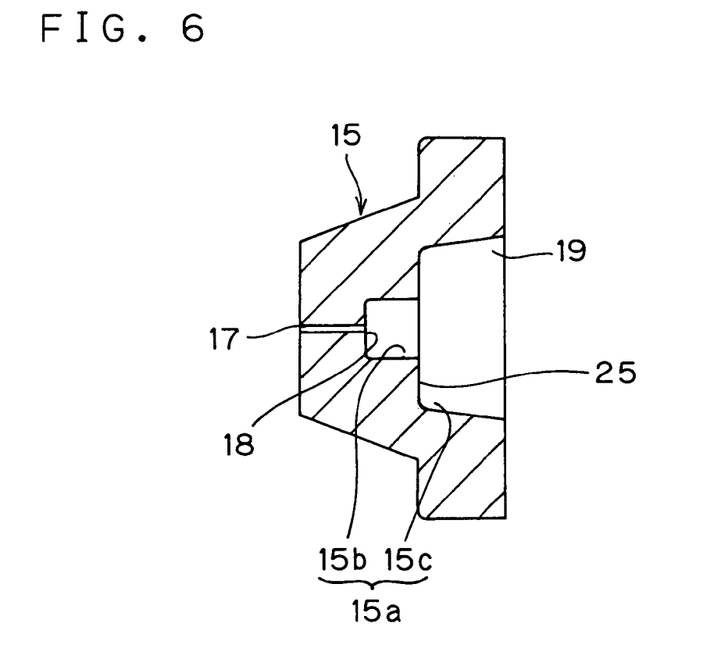
FIG. 6: A sectional view taken on the line VI-VI in FIG. 4 and explanatory of the configuration of the cavity of the above die.

FIG. 1 is a schematic side view showing an extruder constituting a forming apparatus used in accordance with a rubber-strip forming method of the invention. FIG. 2 is a sectional view explanatory of the above extruder. FIG. 3 is a front view exemplarily showing shape of a discharge port of the die, whereas FIG. 4 is an elevational view of the die seen from rearward and FIGS. 5 and 6 are sectional views of the die.

According to the invention, a rubber strip 1 as formed is used for manufacturing a tire T as a radial tire shown in FIG. 15, which is comprised of a plurality of rubber parts including an inner liner rubber part 2, a tread rubber part 3, a side wall rubber part 4, a rim strip rubber part 5 and the like. The rubber strip 1 is used for windingly building at least one of the aforesaid rubber parts, such as the inner liner rubber part 2 or the tread rubber part 3. The rubber strip is shaped as a ribbon.

Figure 7:
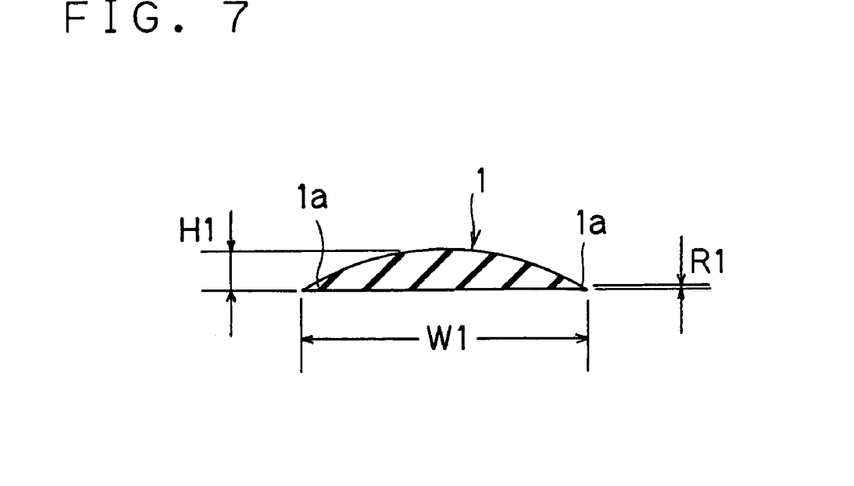
FIG. 7: A sectional view illustrating an exemplary sectional shape of the rubber strip to be formed.
Figure 8:
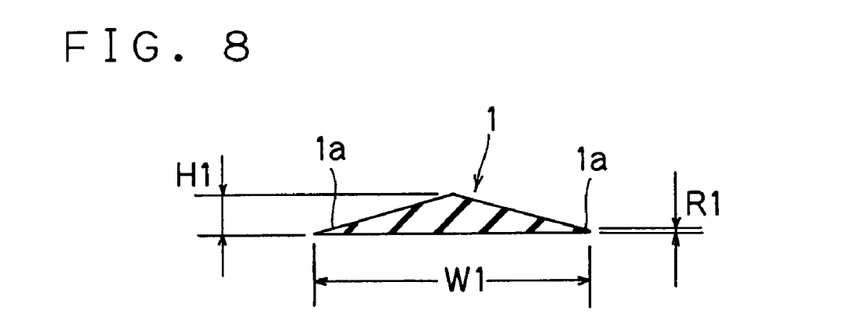
FIG. 8: A sectional view illustrating another exemplary sectional shape of the above rubber strip.
Figure 9:
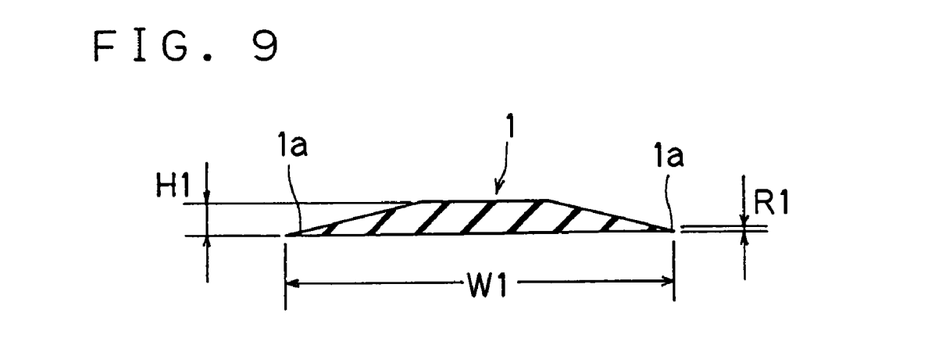
FIG. 9: A sectional view illustrating still another exemplary sectional shape of the above rubber strip.

The flat ribbon-shaped rubber strip 1 has typically a maximum thickness at center part in respect of widthwise direction. Thickness of the rubber strip 1 progressively decreases with leaving from the central part toward both edges of the strip. The ribbon-shaped rubber strip 1 has a sectional shape of, for example, substantially a crescent as in FIG. 7, substantially a flat triangle as in FIG. 8, or a flat trapezoid as in FIG. 9. In the figures, a reference character W1 represents the width of the rubber strip 1, H1 represents the maximum thickness of the rubber strip 1, and R1 represents the thickness at around edges of the rubber strip 1. A will be described later, these dimensions are in general set in preferred ranges from the standpoint of wind-wise building the rubber part.

An extruder 10 comprising an apparatus for extruding the rubber strip 1 includes; a main-part casing 11 having a cylindrical section; a feeding screw shaft 12 accommodated therein; a head 13 having a gear pump 14 and continuous to a distal end of the main-part casing 11; and a die 15 attached to a distal end of the head 13. The extruder is arranged such that a rubber material Q fed into the main-part casing 11 by way of a hopper 16 is advanced forward by way of the rotation of the screw shaft 12; and is continuously extruded by the gear pump 14 in the head 13 as to be outputted from the die 15 in the form of a ribbon.

In the apparatus for forming the rubber strip 1 according to the invention-wise forming method, setting or designing for temperature controlling is made as follows. Such controlled temperature is made uneven among the main-part casing 11, the screw shaft(s) 12 at inside of the casing, and a region of the head 13 including the die 15. The controlled temperature for the screw shaft(s) 12 is higher than that for the main-part casing 11 while controlled temperature for the head 13 is higher than that of the main-part casing 11.

For the region of the head 13, the temperature controlling may be made such that the controlled temperatures are equal throughout the region including the die 15 connected on a distal end of the head 13. In otherwise, the temperature controlling may be made such that the controlled temperature for the die 15 is higher than that of the head 13 by separate temperature controlling between them. In these manners, set temperature for the die 15 may be made equal or higher than that of the head 13.

Differences may be set and adjusted among the controlled temperatures of the main-part casing 11, the screw shaft 12, the head 13 and the die 15 in accordance with composition or kind of the rubber being fed. Temperature controlling may be accordingly made by directive signals or the like from a controller etc. Such controlled temperature is at least 50° C., and usually set or adjusted in a range of 50 to 100° C. as specific setting or adjusting is made according to the occasion arisen.

The die 15 has a shoulder 18 for narrowing down a passage as well as a discharge port 17 for extruding that is disposed at middle of the shoulder 18 and is continuous with distal end of the cavity 15a in the die 15 by way of the shoulder 18. The discharge port 17 has in its section substantially a shape of a crescent, a flat triangle or a flat trapezoid in correspondence to the sectional shape of the rubber strip 1 to be formed as in FIG. 7, 8 or 9, for example. In other words, the dies are formed in a certain sectional shape as to mold rubber material Q fed thereto into a long strip that has corresponding sectional shape. In FIG. 3, a reference character W represents the width of the discharge port 17, 11 represents the maximum gap of the discharge port 17, and R represents the gap at edge portions, or the transversely opposite sides, of the discharge port 17. The width W, the maximum gap H and the gap R correspond to the width W1, the maximum thickness H1 and the thickness R1 at around edges of the rubber strip 1, respectively.

The configuration of the cavity 15a in the die 15 may be a shape simply tapered toward the shoulder 18 for narrowing down in same manner with the prior art, and may be either of ones shown in FIGS. (17 to 19 for example.) However, according to the invention, the configuration of the cavity is preferably one shown in FIGS. 4 to 6.

The die 15 shown in FIGS. 4 to 6 has an intermediate narrowing-down portion 25 substantially at middle between the rear end opening 19 and the discharge port 17, in the cavity 15a, as a stepped portion between a distal part 15b and rear part 15c of the cavity 15a. Thus, narrowing down of the passage for the molten rubber material Q is made at both of the shoulder 18 and the intermediate narrowing-down portion 25.

In a view from rearward, the distal part 15b of the cavity is shaped as a long hole in correspondence with the longitudinal direction of the discharge port 17 and is continuous with the shoulder 18 on distal side. Thus, in such view, the shoulder 18 for narrowing down has an outline equal to that of the distal part 15b of the cavity; the discharge port 17 is disposed at center of the distal part 10b. The distal and rear parts 15b, 15c of the cavity may be constructed not only constructed as one of them (at distal) is tapered and the other (at rear) is not tapered as shown in the figure, but also may be constructed to have any of the tapered and not-tapered configuration.

Extent of the narrowing down or throttling by the intermediate narrowing-down portion 25, which is a stepped dimension between the distal and rear parts 15b, 15c of the cavity, varies with configuration of the rubber strip 1 being formed or kind of the rubber material or the like. In practice, however, it is preferably set in a range of 20 to 50%, and more preferably in a range of 30 to 40%, in respect of percentage of a cross sectional area of opening in middle of the intermediate narrowing-down portion 25, as taken by a corresponding area of an inner periphery face of the rear part 15c of the cavity as extended to the opening in middle of the narrowing-down portion 25.

When the percentage of the narrowing-down portion 25 exceeds the above range, throttling effect is difficult to be attained; and when the percentage is below the above range, extrusion resistance of the rubber material becomes large. Thus, the above range is desirable in practice.

Invention-wise method of forming the rubber strip 1 is carried out as follows, using the aforesaid forming apparatus. The rubber material Q fed into the main-part casing 11 of the extruder 10 is forwarded by the screw shaft 12 into the head 13 as to be continuously extruded in a form of ribbon, from the discharge port 17 of the die 15 under action of a gear pump 14 in the head 13. It is noteworthy that, in this process, temperature controlling is set in a manner that temperature of the main-part casing 11 is higher than that of the screw shaft 12 and the temperature of the head 13 is higher than that of the main-part casing 11. Thus, temperature of the rubber material is progressively raised while passing through the extruder before being extruded out.

Therefore, the rubber strip 1 extruded as above is restrained from sustaining defects such as cracks or cutouts at along edges 1a of the rubber strip on both sides, even though the extruding speed is not moderated as in the conventional apparatus. Moreover, it is obtainable the rubber strip 1 of slight thickness at along edges and having a greater width than conventional method, without moderating the extruding speed. For instance, there arises no problem in extruding the rubber strip 1 from the die 13, substantially in the sectional shape of a crescent, triangle or trapezoid, so as to have: a width of 5 to 50 mm; a thickness of 0.5 to 3.0 mm at along centerline; and a thickness of 0.05 to 0.2 mm at along edges on both sides.

Particularly, when the cavity 15a of the die 15 of the extruder 10 has the aforementioned throttling configuration as shown in FIGS. 4 to 6, it dramatically increases a threshold speed for starting to cause defects at along edges; as compared with a case where the dies having the conventional configuration is used. Moreover, in same time of increasing the extruding the speed, it is attainable the rubber strip 1 having greater width and reduced thickness at along the edges, as compared with the conventional rubber strip.

The table 1 below shows the results of a forming test on the rubber strip 1 to be used for the inner liner rubber part, which has a high viscoelasticity and in which a high extent of thickness reduction is required. The forming test was conducted with the temperatures controlled as set to vary among the screw shaft 12, the main-part casing 11, the head 13 and the die 15. Then, the threshold speed for starting to cause the defects at along edges is determined to each forming test as to make a comparison.

The table 2 below shows the results of a forming test on the rubber strip 1 to be used for the tread rubber part, which has a relatively low viscoelasticity. The forming test was conducted with the temperatures controlled as set to vary among the screw shaft 12, the main-part casing 11, the bead 13 and the die 15. Then, the threshold speed for starting to cause the defects at along edges is determined to each forming test as to make a comparison.

In both of the tables 1 and 2, each of the threshold speeds for starting to cause the defects are given as an index or ratio assuming the threshold speed for Comparative Example 1 as 100, in which all the temperatures are set to be controlled as equal. The alphabets A, B, C, D, E, F, G, H in the tables represent temperatures in a decreasing order, to which each temperature controlling is made.

TABLE 1

| Region | Temperature control conditions | | | | Threshold speed for causing defect at along edges m/min (index) |
|---|---|---|---|---|---|
| | Die | Head | Main-part casing | Screw shaft | |
| Comparative Example | C | C | C | C | 100 |
| Example 1 | C | C | E | F | 130 |
| Example 2 | B | B | E | G | 150 |
| Example 3 | A | B | E | G | 150 |

Controlled temperature: highest A > B > C > D > E > F > G > H lowest

TABLE 2

| Region | Temperature control conditions | | | | Threshold speed for causing defect at along edges m/min (index) |
|---|---|---|---|---|---|
| | Die | Head | Main-part casing | Screw shaft | |
| Comparative Example | E | E | E | E | 100 |
| Example 1 | E | E | F | G | 130 |
| Example 2 | D | D | F | H | 140 |
| Example 3 | C | D | F | H | 140 |

Controlled temperature: highest A > B > C > D > E > F > G > H lowest

The results of the tables 1 and 2 indicate that the threshold speed is increased by 30 to 50% from that of Comparative Example, by progressively increasing the controlled temperatures for the screw shaft 12, the main-part casing 11 and the head 13. That is, it is demonstrated that the invention-wise forming method is effective to prevent the occurrence of the defects at along edges, by setting temperatures for controlling in a manner as progressively increased in order of; the screw shaft 12, the main-part casing 11 and the head 13.

It is additionally noted that: no considerable difference is observed between the case where the controlled temperature for the die 15 is higher than that of the head 13 and the case where those temperatures are equal.

The table 3 below shows test results as the threshold speed, where tests are made under various configurations of the die, on premise of that the temperatures are set as progressively increased in order of the screw 12, the main-part casing 11 and the head 13, in view of the results of tables 1 and 2.

In the table 3, Example 1 represents dies for forming the inner liner rubber part; Example 2 represents dies for forming a first layer of the tread rubber; Example 3 represents dies for forming a second layer of the tread rubber part; and Example 4 represents dies for forming sidewall rubber part. Comparative Example 1 represents the dies, the cavity of which is configured as shown in FIGS. 17 to 19. The reference characters W, H, R each represent a dimension of the discharge port 17 shown in FIG. 3, where the width is 5 to 50 nm, and a thickness is 0.5 to 3.0 mm at along its centerline and is 0.05 to 0.2 mm at along edge portion on both sides. Meanwhile, numerical values of H/R, W/R and W are each represented by an index or percentage ratio to the corresponding dimension of the die of the comparative example.

In the table 3, the area of the intermediate narrowing-down portion represents area of opening at the narrowing-down portion 25 in the cavity of the die shown in FIGS. 4-6, and is expressed as an index or percentage ratio to the corresponding area in the die shown in FIGS. 17-19, of the Comparative example 1. In same manner, the threshold speed for causing the defect at along edges are also expressed as an index or percentage ratio to the corresponding speed obtained for the die of the comparative example 1.

TABLE 3

| | Example 1 | Example 2 | Example 3 | Example 4 | Comparative Example |
|---|---|---|---|---|---|
| H/R | 100 | 120 | 60 | 20 | 100 |
| W/R | 350 | 115 | 100 | 50 | 100 |
| W | 250 | 125 | 100 | 100 | 100 |
| Area of the intermediate narrowing-down portion | 36 | 35 | 32 | 39 | 100 |
| Threshold speed for causing defect at along edges | 200 | 750 | 550 | 700 | 100 |

The results shown in the table 3 indicate the following fact regarding the rubber strip to be used for the inner liner rubber part having a high viscoelasticity. The rubber strip of each example has the same H/R value as that of the comparative example but much greater W/R and W values than those of the comparative example. In other words, while the rubber strip of each example has the large width and the reduced thickness at along edges, the threshold speed is dramatically increased (by a factor of 2 or more) from that of the comparative example by disposing the intermediate narrow-down portion in the cavity of the dies.

As also for the rubber strips to be used for the other rubber parts, the threshold speed is dramatically increased as compared with that of the comparative example.

Accordingly, the extruding speeds for the rubber strips to be used for the individual rubber parts may be increased from that for the conventional rubber strip without the fear of causing defects at along edges. Furthermore, the wider rubber strip of slight thickness is formed without fear of causing defects at along edges.

Description will be made on a method of manufacturing a tire using the rubber strip 1 formed in the aforementioned manner.

Figure 10:
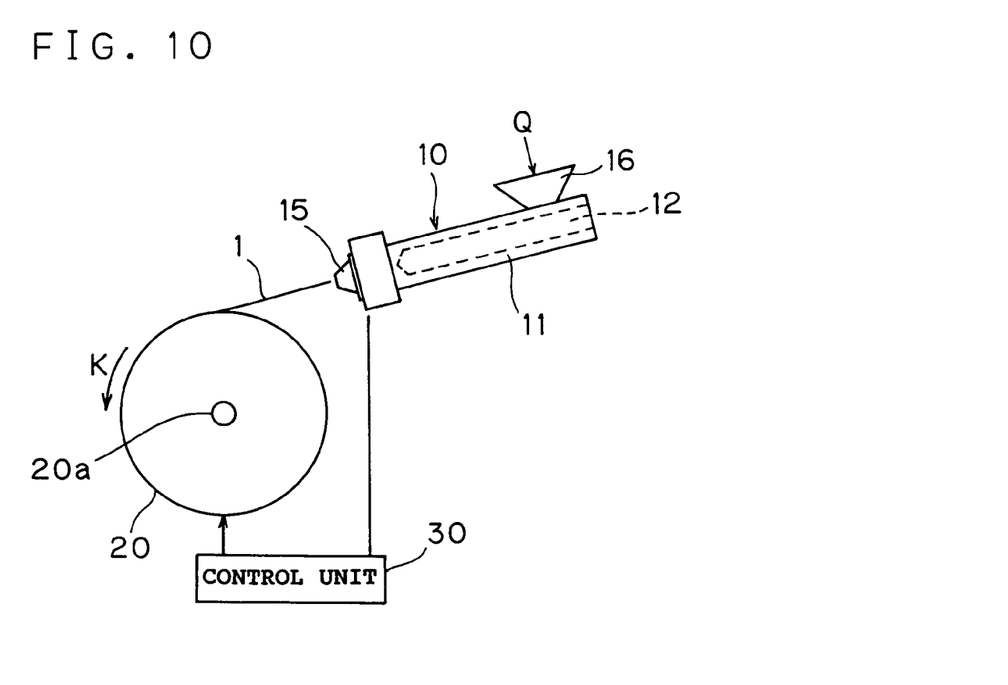
FIG. 10: A schematic diagram for explaining a method of building a rubber part by winding and attaching the rubber strip extruded from the extruder.

FIG. 10 is a schematic diagram explanatory of a method used in the tire manufacturing procedure for building a tire rubber part such as the inner liner rubber part 2, the tread rubber part 3, the side wall rubber part 4, or the rim strip rubber part 5. The tire rubber part is built by winding-wise attaching on a rotary support body 20 such as a tire-building drum, the rubber strip 1 extruded from the aforementioned extruder 10.

FIG. 10 illustrates a case where the extruder 10 is disposed in face-to-face relation with the rotary support body 20 so that the rubber strip 1 extruded from the extruder 10, as ribbon shaped with a predetermined section is directly wound on the rotary support body 20. The rotary support body 20 is free to rotate about an axis 20a. The rubber strip 1 is wound and attached on the rotary support body 20 along a circumferential direction of tire while the rotary support body 20 is rotated in a "K" direction in FIG. 10.

Figure 11:
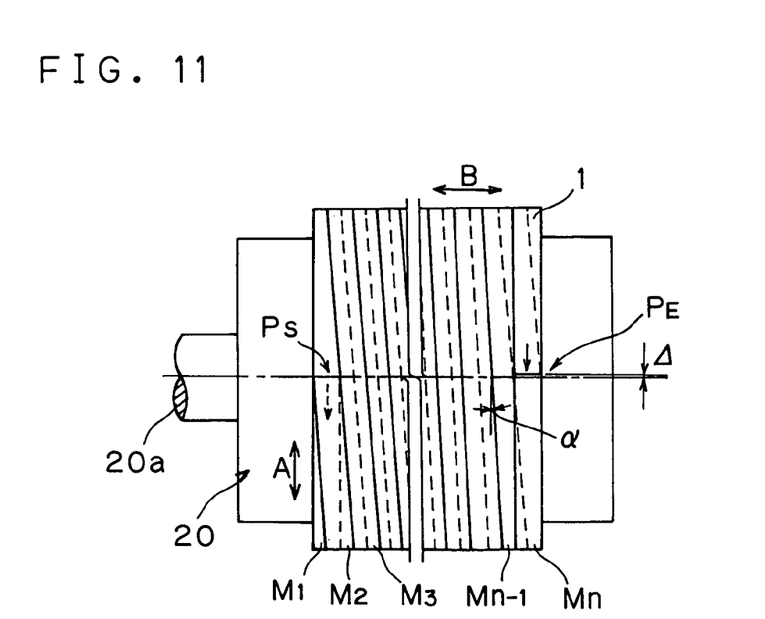
FIG. 11: A plan view for explaining how to wind the rubber strip.

FIG. 11 is a view of a rotary support body 20 as viewed from upward. In the figure, Arrow A represents the circumferential direction of tire whereas Arrow B represents a widthwise direction of tire (axial direction). The rubber strip 1 is spirally wound along the circumferential direction of tire. During the winding of the rubber strip 1, the rotary support body 20 is rotated and besides, the extruder 10 is moved relative to the rotary support body along the widthwise direction B of a tire. For this purpose, either the extruder 10 or the rotary support body 20 is moved along the widthwise direction of a tire.

In the example shown in FIG. 11, the rubber strip 1 is wound as moved from the left-hand side to the right-hand side. In the figure, the first winding (the first full circle) is represented by $M_1$, the second winding is represented by $M_2$, the third winding represented by $M_3$, . . . the "n–1"-th winding represented by $M_{n-1}$, and the n-th (final) winding represented by $M_n$. It is noted here that the first winding m1 and the n-th winding $M_n$ are wound in the same winding direction which is orthogonal to the widthwise direction of tire, or parallel to the circumferential direction of a tire. As being wound in the spiral form, the other windings are made in a direction inclined at an angle α to the circumferential direction of tire. If the first winding and the n-th winding were also made to be inclined at the angle α, a step of cutting off unwanted frill would be required. The step of cutting off the unwanted frill is obviated by directing the first and n-th windings in the same direction as the circumferential direction of tire.

The arrangement to direct the first and n-th windings in the circumferential direction of tire may be implemented by providing such a control as not to bring the extruder 11 into the relative movement along the widthwise direction of tire. Incidentally, a control unit 30 controls the operations of the extruder 10 and the rotary support body 20.

In FIG. 11, a winding start position is represented by $P_S$, whereas a winding end position is represented by $P_E$. The rubber strip is wound in a manner to ensure that a positional misalignment Δ between the winding start position $P_S$ and the winding end position $P_E$ is in the range of 0 to 5 mm, with respect to the circumferential direction of tire. This keeps a tire to be well balanced in weight distribution.

Figure 12:
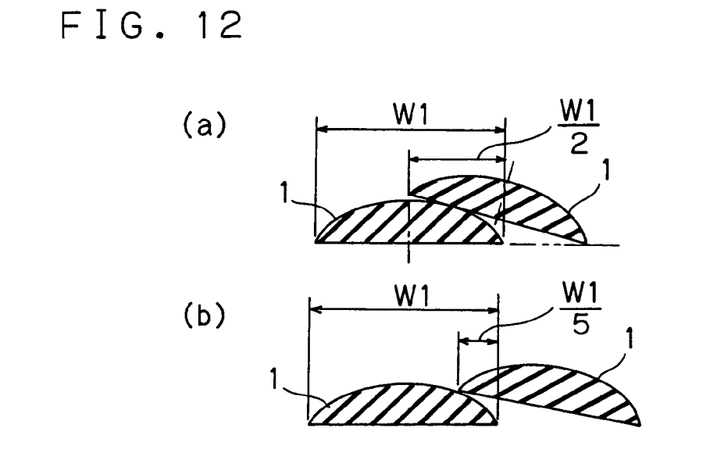
FIG. 12: A sectional view for explaining how to overlap the rubber

FIG. 12 are diagrams for explaining how to overlap the rubber strip 1 in the widthwise direction of tire. It is preferred to make side-by-side overlapping by ½ (a half) to ⅕ of the width W1 of the rubber strip 1, (please see FIGS. 12(a) and (b)). This is because, when the overlapped part is ½ or less of the width W1, the unevenness at the overlapped part is less apparent. The reason for making the overlapping by at least ⅕ of the width W1 is; smaller overlapping than this value may cause side-by-side tearing apart between portions of the rubber strip. Extent of the overlapping may be controlled or adjusted by the control unit 30, which controls the speed of relative movement between the extruder 10 and the rotary support body 20 with respect to the widthwise direction of tire.

In this way, shaping of the rubber part is made highly precisely by varying the extent of overlapping between the adjoining parts of the rubber strip and by varying the sectional shape of the rubber strip. Particularly, by using the rubber strip 1 formed in the aforementioned manner, even higher precisions in shaping the tire is achievable, as to produce a tire of high quality.

Figure 13:
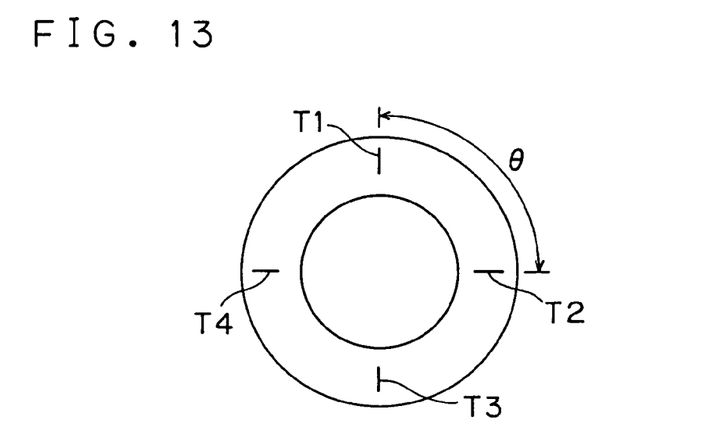
FIG. 13: A diagram illustrating a preferred positioning of winding start positions for individual rubber parts.
Figure 14:
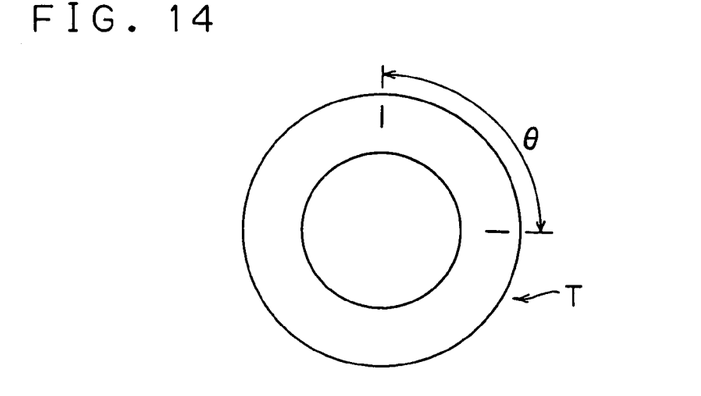
FIG. 14: A diagram explanatory of the winding start position for the above rubber part.

FIG. 13 is a diagram showing a preferred positioning of the winding start positions in a case where a plurality of rubber parts are built by winding and attaching the rubber strip 1. Referring to FIG. 13, a winding start position for the inner liner rubber part 2 is schematically indicated by T1; that for the tread rubber part 3 schematically indicated by T2; that for the side wall rubber part 4 schematically indicated by T3; and that for the rim strip rubber part 5 schematically indicated by T4. If these positions T1, T2, T3, T4 are concentrated at the same place, there is a fear of impairing the balance performance of a tire. It is therefore preferred that a phase shift between each pair of the start positions with respect to the circumferential direction of tire (indicated by θ in FIG. 14) is 10 degrees or more. In the example shown in the figure, the individual start positions have an equal phase shift θ=90°.

The tread rubber part 3 is constituted by two kinds of rubber strips for forming the first layer and the second layer. Accordingly, it is preferred that a winding start position to wind the rubber strip for the first layer (under layer) and a winding start position to wind the rubber strip for the second layer (upper layer) have a phase shift of 10 degrees or more with respect to the circumferential direction of tire.

The winding end position is shifted from the winding start position by 0 to 5 mm. Therefore, if the winding start positions are shifted by 10 degrees or more, the winding end positions are also shifted by 10 degrees or more.

In this manner, the individual rubber parts may be built by winding the rubber strips 1 whereby the tire performances such as the weight balance are favorably maintained.

The foregoing description of the building method takes the example wherein the rubber strip 1 being extruded from the extruder 10 is fed onto the rotary support body 10 such as the building drum, as to be wound and attach thereon to build the rubber part. However, it is also possible to extrude the rubber strip on beforehand in a process step separate from a strip winding, and to transport the rubber strip to a strip winding process step where the rubber strip is continuously fed onto the rotary support body via a feeder, as to be wound and attach thereon to build the rubber part.

The invention is preferably applicable to forming of tire parts and building the tire therefrom, where the un-vulcanized rubber strip is extruded in the form of a ribbon is spirally wound on the rotary support body such as the building drum, in the overlapped relation along the circumferential direction.

[Reference Characters]
T TIRE
Q RUBBER MATERIAL
1 RUBBER STRIP
2 INNER LINER RUBBER PART
3 TREAD RUBBER PART
4 SIDE WALL RUBBER PART
5 RIM STRIP RUBBER PART
10 EXTRUDER
11 MAIN-PART CASING
12 SCREW SHAFT
13 HEAD
14 GEAR PUMP
15 DIE
15a CAVITY
15b DITAL-PART OF CAVITY
15c REAR-PART OF CAVITY
16 HOPPER
17 DISCHARGE PORT
11 SHOULDER FOR NARROWING DOWN
19 REAR OPENING OF THE DIE
20 ROTARY SUPPORT BODY
25 INTERMEDIATE NARROWING-DOWN PORTION
30 CONTROL UNIT

The invention claimed is:

1. A method of forming an un-vulcanized rubber strip comprising the steps of:
obtaining an extruder, the extruder including a casing, a screw shaft disposed within the casing, a head region connected to a downstream end portion of the casing and a die connected to a downstream end portion of the head region;
a temperature of each of the casing, the screw shaft and the head region being independently controllable;
the die having a plurality of axially collinear and axially connected cavities extending therethrough, including first, second and third cavities, where the first cavity communicates with the downstream end portion of the head region, the second cavity is downstream of the first cavity and the third cavity is downstream of the second cavity;
the third cavity having an opening profile in which thickness of the opening profile is progressively reduced from approximately the centerline of the cavity to opposing edges of the opening profile;
continuously extruding the rubber through said extruder to form a rubber strip;
the step of continuously extruding the rubber further comprising:
controlling the temperature of each of the casing, the screw shaft and the head region so that:
the temperature of the casing is higher than that in the screw shaft; and
the temperature of the head region is higher than that in the casing; and
wherein the rubber strip extruded from the die has a profile shape conforming to the opening profile of the third cavity.

2. The method of claim 1, wherein the temperature of the die is controlled to be equal to or higher than the temperature of the head region.

3. The method of claim 1 or 2, wherein a width of the extruded rubber strip is in a range of 5 to 50 mm while the thickness of the rubber strip is in a range of 0.5 to 3.0 mm at around the centerline, and in a range of 0.05 to 0.2 mm at along the edges.

4. A method for manufacturing a tire comprised of a plurality of rubber parts;
the method comprising:
obtaining a rotary support body for building the tire;
forming at least one of said rubber parts as a rubber strip according to the method of claim 1; and
feeding the rubber strip to the rotary support body; and
winding the rubber strip in a tire circumferential direction around the support body so that the rubber strip partially overlaps an adjacent rubber part wound onto the support body.

5. The method of claim 4, wherein the rubber strip is wound around the support body so that a positional misalignment in a tire circumferential direction is formed in a range of 0 to 5 mm between start and end edges of the rubber strip.

6. The method of claim 4 or 5, wherein extent of being overlapped is in a range of ½ to ⅕ of a width of said rubber strip, in a widthwise direction of the tire.

7. The method of claim 4 or 5, wherein at least two of the plurality of rubber parts are formed by spirally winding around the support body along a circumferential direction of the tire, and
wherein starting rotation-wise positions of the respective rubber pans are spaced from each other by 10 degrees or more in the circumferential direction of the tire.

* * * * *